(12) United States Patent
Wilkes

(10) Patent No.: US 11,505,659 B2
(45) Date of Patent: Nov. 22, 2022

(54) GAMMA IRRADIATION OF ION EXCHANGE RESINS TO REMOVE OR TRAP HALOGENATED IMPURITIES

(71) Applicant: Evoqua Water Technologies LLC, Pittsburgh, PA (US)

(72) Inventor: Marty Wilkes, Roscoe, IL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 17/109,497

(22) Filed: Dec. 2, 2020

(65) Prior Publication Data

US 2021/0340340 A1    Nov. 4, 2021

Related U.S. Application Data

(62) Division of application No. 15/759,866, filed as application No. PCT/US2016/051660 on Sep. 14, 2016, now Pat. No. 10,882,965.

(60) Provisional application No. 62/219,375, filed on Sep. 16, 2015.

(51) Int. Cl.
| | |
|---|---|
| *C08J 3/28* | (2006.01) |
| *B01J 47/04* | (2006.01) |
| *B01J 47/06* | (2006.01) |
| *B01J 41/05* | (2017.01) |
| *B01J 39/05* | (2017.01) |
| *B01J 47/016* | (2017.01) |
| *B01J 39/18* | (2017.01) |
| *B01J 41/12* | (2017.01) |
| *C02F 1/42* | (2006.01) |
| *C02F 101/10* | (2006.01) |
| *C02F 101/12* | (2006.01) |
| *C02F 103/02* | (2006.01) |
| *C02F 103/34* | (2006.01) |

(52) U.S. Cl.
CPC ............... *C08J 3/28* (2013.01); *B01J 39/05* (2017.01); *B01J 39/18* (2013.01); *B01J 41/05* (2017.01); *B01J 41/12* (2013.01); *B01J 47/016* (2017.01); *B01J 47/04* (2013.01); *B01J 47/06* (2013.01); *C02F 1/42* (2013.01); *C02F 2001/422* (2013.01); *C02F 2001/425* (2013.01); *C02F 2001/427* (2013.01); *C02F 2101/101* (2013.01); *C02F 2101/12* (2013.01); *C02F 2103/023* (2013.01); *C02F 2103/34* (2013.01)

(58) Field of Classification Search
CPC ..... C08J 3/28; B01J 47/04; B01J 47/06; B01J 47/016; B01J 41/05; B01J 41/12; B01J 39/05; B01J 39/18; C02F 1/42; C02F 2001/422; C02F 2001/425; C02F 2001/427; C02F 2101/101; C02F 2101/12; C02F 2103/023; C02F 2103/34
USPC ........................................................ 210/683
See application file for complete search history.

(56) References Cited

U.S. PATENT DOCUMENTS

| | | | | |
|---|---|---|---|---|
| 5,948,265 A | * | 9/1999 | Wakamatsu ............. | B01J 41/10 210/683 |
| 2003/0019818 A1 | | 1/2003 | Carson | |
| 2005/0029087 A1 | * | 2/2005 | Kamegai .................. | B01J 49/30 204/525 |
| 2007/0031716 A1 | * | 2/2007 | Rajendran ............ | H01M 8/1011 429/316 |
| 2011/0172115 A1 | | 7/2011 | Thompson | |

OTHER PUBLICATIONS

Young, Lee W., "Written Opinion of the International Searching Authority", International Application No. PCT/US2016/051660, dated Dec. 7, 2016, 6 pages.
Young, Lee W., "International Search Report", International Application No. PCT/US2016/051660, dated Dec. 7, 2016, 2 pages.
Mohri, Mineko, "International Preliminary Report on Patentability", International Application No. PCT/US2016/051660, dated Mar. 20, 2018, 7 pages.
Unknown, "Office Action", Korean Application No. 10-2018-7010546, dated Jan. 16, 2021, 3 pages.

* cited by examiner

*Primary Examiner* — Michael M. Bernshteyn

(57) ABSTRACT

A method of producing treated ion exchange resin material includes exposing an enclosed vessel containing ion exchange resin and a pre-treatment solution to high energy radiation. The treated ion exchange resin material has reduced organic impurities or total organic carbon (TOC).

18 Claims, 7 Drawing Sheets

GAMMA IRRADIATION OF ION EXCHANGE RESINS TO REMOVE OR TRAP HALOGENATED IMPURITIES

RELATED APPLICATIONS

This application is a divisional of U.S. application Ser. No. 15/759,866, filed Sep. 14, 2016, titled "GAMMA IRRADIATION OF ION EXCHANGE RESINS TO REMOVE OR TRAP HALOGENATED IMPURITIES," now U.S. Pat. No. 10,882,965, issued Dec. 12, 2020, which is a U.S. National Stage Application of PCT/US2016/051660, filed Sep. 14, 2016, titled "GAMMA IRRADIATION OF ION EXCHANGE RESINS TO REMOVE OR TRAP HALOGENATED IMPURITIES" which claims priority to U.S. Provisional Application Ser. No. 62/219,375 titled "GAMMA IRRADIATION OF ION EXCHANGE RESINS TO REMOVE OR TRAP HALOGENATED IMPURITIES" filed on Sep. 16, 2015, which are herein incorporated by reference in their entireties.

FIELD OF TECHNOLOGY

Aspects and embodiments disclosed herein relate to treatment of ion exchange resins. More particularly, aspects and embodiments disclosed relate to treatment of ion exchange resin with exposure to high energy radiation to remove organic impurities in the ion exchange resin.

SUMMARY

In accordance with an aspect, there is provided a method of producing a treated ion exchange resin material. The method of producing a treated ion exchange resin material comprises providing ion exchange resin and a pre-treatment solution in a vessel comprising a void space, and exposing the vessel to gamma irradiation in a range of about 1 Gy to about 1 MGy, to produce a treated ion exchange resin material having reduced organic impurities or total organic carbon (TOC).

In some embodiments, the pre-treatment solution is at least one of purified water, an acid, and a base.

In some embodiments, the source of gamma irradiation is cobalt 60.

In some embodiments, the method of producing a treated ion exchange resin material further comprises washing the treated ion exchange resin material.

In some embodiments, the organic impurities are selected from organochloride compounds, organosulfonate compounds, and TOC compounds.

In some embodiments, the treated ion exchange resin material comprises less than about 10,000 ion intensity counts of at least one of an organochloride compound impurity.

In some embodiments, the gamma irradiation is in the range of about 0.1 KGy to about 1 MGy. In other embodiments, the gamma irradiation is in the range of about 25 KGy to about 75 KGy. In yet other embodiments, the gamma irradiation is about 25 KGy, about 50 KGy, or about 75 KGy.

In accordance with another aspect, there is provided a treated ion exchange resin material. The treated ion exchange resin material contains a reduced level of organic impurities or TOC, as compared to an untreated ion exchange resin.

In some embodiments, the treated ion exchange resin material is produced by an embodiment of a method of producing a treated ion exchange resin material, provided herein.

In some embodiments, the treated ion exchange resin material has reduced organic impurities. In other embodiments, the treated ion exchange resin material is capable of purifying a water solution to contain less than about 1.0 ppb chloride compounds, less than about 1.0 ppb sulfide compounds, and less than about 10 ppb total organic carbon compounds. In yet other embodiments, the treated ion exchange resin material is capable of purifying a water solution to contain less than about 10 ppt chloride compounds, less than about 10 ppt sulfide compounds, and less than about 100 ppt total organic carbon compounds.

In some embodiments, the treated ion exchange resin material contains a reduced level of at least one of organochloride compounds, organosulfonate compounds, and TOC compounds, as compared to an untreated ion exchange resin.

In some embodiments, the treated ion exchange resin material is at least one of an anion exchange resin, a cation exchange resin, and a mixed bed resin.

In accordance with another aspect, there is provided a method of obtaining a reduced ion or TOC concentration in a solution. The method of obtaining a reduced ion or TOC concentration in a solution comprises providing a solution and contacting the solution with a treated ion exchange resin material having reduced organic impurities.

In some embodiments, the ion concentration is a chloride concentration. In other embodiments, the ion concentration is a sulfide concentration. In yet other embodiments, the ion concentration is a sulfate concentration.

In some embodiments, the organic impurities are selected from organochloride compounds, organosulfonate compounds, and TOC compounds.

In some embodiments, the solution is a nuclear reactor cooling solution.

In some embodiments, the solution is a semiconductor manufacturing solution.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
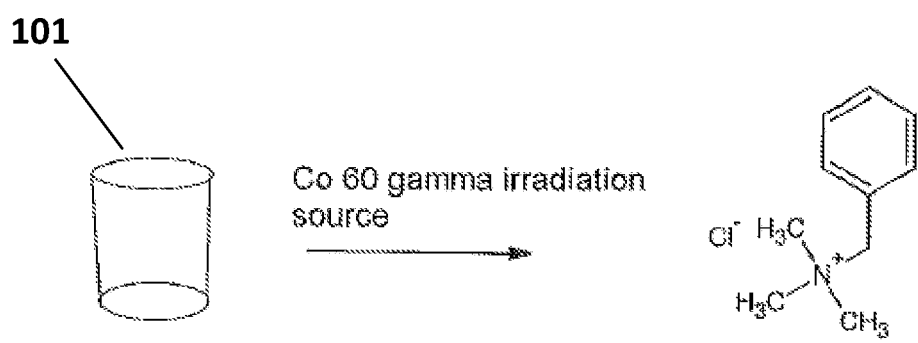
FIG. 1 is a schematic diagram of a method of producing treated anion exchange resin material, according to one embodiment.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Ion exchange is often used in water treatment, where ions in aqueous solution typically displace hydrogen ($H^+$) or hydroxide ($OH^-$) ions bound to a substrate. This is sometimes known as "water demineralization" or "water deionization." The substrate, such as a resin, is conventionally made from a polymeric material or a zeolite. The ions are exchanged stoichiometrically, maintaining electroneutrality of the system. A resin that exchanges one positive ion (or a proportionate quantity based on valency), such as hydrogen, for another positive ion, such as copper, iron, or sodium, is a cation resin. A resin that exchanges one negative ion (or a proportionate quantity based on valency), such as hydroxide, for another negative ion, such as chloride, sulfate, or chromate, is an anion resin. In many cases, both types of resins are used to remove various salts, such as sodium chloride or calcium sulfate, from solution. A mixed bed ion exchange resin includes a combination of cation resin and anion resin to provide a higher purity of deionized water. The resin may be used until it becomes saturated with the ions being removed. Many resins may also be regenerated and reused. For example, resins used in water treatment may be regenerated by using strong acids (cation resins) or strong bases (anion resins).

Ion exchange columns or beds containing resins are commonly used in industries where purity of water may be important. Ion exchange columns are especially important in industries with closed-loop circulation systems, such as those used in cooling equipment, where ion concentrations may increase to high levels because of the lack of an outlet for ions leaching from the surrounding piping and equipment. Ion exchange columns also see use in industries with high purity water requirements, such as in semiconductor manufacturing and the nuclear power industry.

During use of the ion exchange columns or beds, contaminants originating from the resins can leach out into solution that the ion exchange resins are meant to purify. The contaminants are in the form of impurities resulting from the resin manufacturing process, for example organic halogenated molecules. Often, ion exchange resin manufacturers recommend pre-washing ion exchange resins prior to use, to remove organic impurities. However, some of the impurities become entrapped in the resin, and are not removed by washing and cleaning steps. Chlorides, bromides, and sulfides that are released into water as a result of these impurities, for example into closed-loop circulation systems in cooling equipment, may be corrosive to components in the cooling system, and are thus undesirable. There exists a need therefore for a treated ion exchange resin having reduced impurities of these types. Aspects and embodiments disclosed herein are directed to methods of producing treated ion exchange resins to, for example, produce an ion exchange resin material having reduced impurities. Producing a treated ion exchange resin material may be referred to herein as "treating" the ion exchange resin. Treating the resin may include at least partially exposing the resin to radiation. Aspects and embodiments disclosed herein relate to treated ion exchange resin material and methods of obtaining a reduced ion and TOC concentration in a solution. Aspects and embodiments disclosed herein are not limited in application to the details of construction and the arrangement of components, systems, or subsystems set forth herein, and are capable of being practiced or of being carried out in various ways.

As noted, ion exchange is the reversible interchange of ions between a solid ion exchange resin and a liquid, in which ion containing liquid solutions are purified, separated, or decontaminated to reduce overall ion concentration. Ion exchange resins may be used in industries with high purity water requirements, for example, in the electronics manufacturing and nuclear power industries. In such industries, ionic species are closely monitored and purified to increasingly high standards. Monitored ionic species include, but are not limited to, chloride, sulfide, bromide, sodium, fluoride, and nitrate ions. TOC may also be monitored and purified from these solutions.

Impurities originating in the resin manufacturing process may remain undetected on or within the ion exchange resin. For example, some ion exchange resins include a cross-linked polymer or polystyrene matrix as a backbone. Ion exchange sites are introduced to the matrix after polymerization. The cross-linked polymer matrix typically has a relatively uniform distribution of ion exchange sites throughout the structure. During polymerization, impurities may arise if trace amounts of monomers become entrapped in polymer matrix and are not removed by subsequent washing or cleaning steps. The entrapped monomers may react with ion exchange sites being introduced to the resin in the reaction steps that follow, creating impurities. Additionally, during installation steps, incomplete reactions may result in further impurities, specifically organic impurities. Table 1 lists some organic chloride species typically found in ion exchange resins.

TABLE 1 organic chloride species found in ion exchange resins.

| | Chlorinated material |
|---|---|
| 1 | Chloromethane |
| 2 | Vinyl chloride |
| 3 | Dichloromethane |
| 4 | Chloromethyl methyl ether |
| 5 | 1,1-Dichloroethane |
| 6 | cis-1,2-Dichloroethene |
| 7 | Chloroform |
| 8 | Carbon tetrachloride |
| 9 | Trichloroethylene(MS 0.01, MS/MS 0.17) |
| 10 | Dichlorobromomethane |
| 11 | 1,2-Dichloropropane(0.01MS, 0.07 MS/MS mass tolerance) |
| 12 | Dibromochloromethane |
| 13 | Chlorobenzene |
| 14 | 2-Chloromethyl-3-methoxy-1-phenyl-1-propanol |

These undetected impurities may break down during use in purification of a solution, polluting the solution with ions. For example, organic impurities may break down during use in a nuclear reactor, allowing ions to leach out into the reactor cooling solution, which increases the overall ion concentration. The leached ions may alter the pH of the solution and lead to intergranular and stress corrosion cracking in metal components causing damage, and are thus undesirable. Similarly, in other industries requiring high purity water, such as the electronics manufacturing industry, resin and solution may be exposed to radiation that breaks down the organic impurities, also allowing ions to leach out into solution.

Ion exchange resins may contain a high concentration of organic impurities, potentially contaminating solution. Some organic impurities may be reduced by washing ion exchange resin before use in a purification process. However, certain impurities are not soluble, and thus are not removed by conventional washing steps. Treating ion exchange resins to produce an ion exchange resin material having reduced impurities may further alleviate these disadvantages, and may further reduce the overall ion concentration in solution, improving solution quality and purification processes.

It is discovered that exposing ion exchange resin to radiation in a specified dosage reduces a level of organic impurities or TOC in the ion exchange resin. Without being bound to a particular theory, it is believed that certain organic impurities, for example compounds of formulas 1-3:

formula (1)

formula (2)

formula (3)

react with free radicals, releasing ions from resin after exposure to gamma irradiation. Specifically, the compound of formula 1, which is not soluble in water, may react in a pre-treatment solution after exposure to radiation, to create the compounds of formulas 2 and 3, which are soluble in water, via the following mechanism,

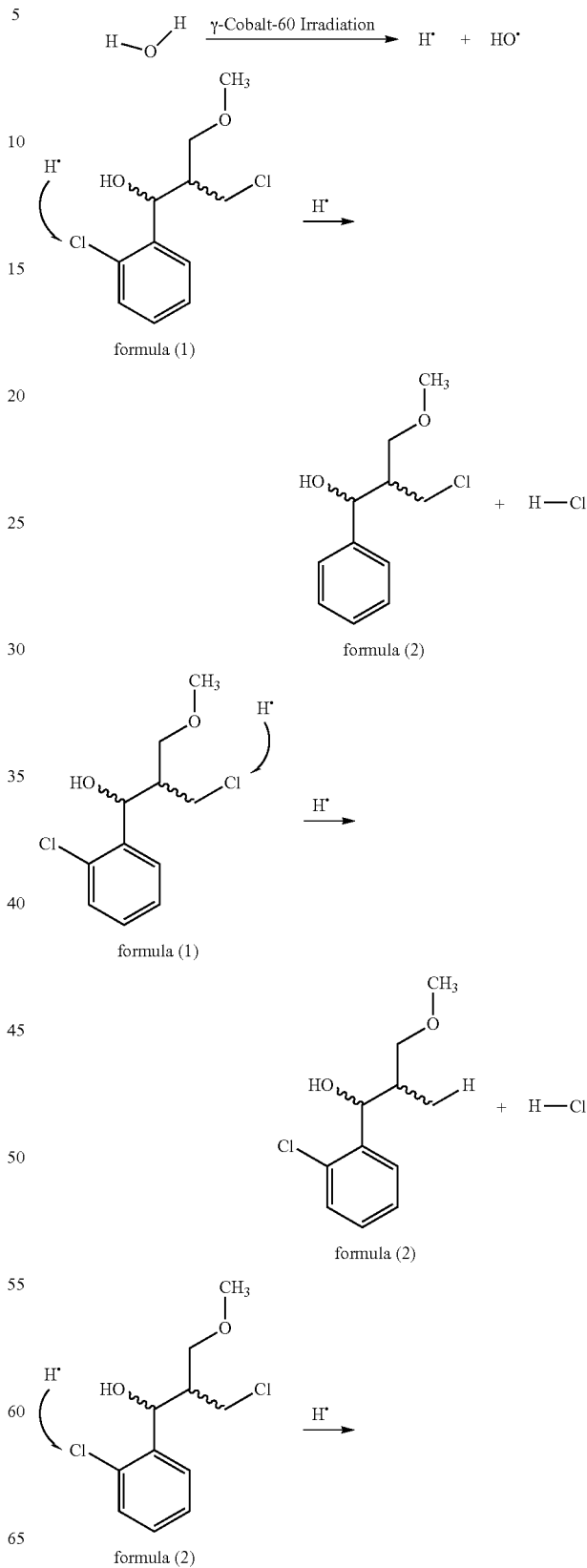

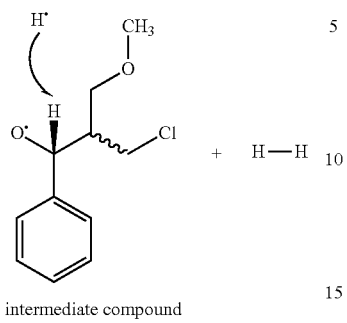

intermediate compound

↓

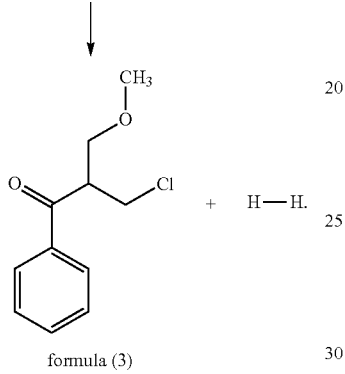

formula (3)

Any remaining impurities in the form of formulas 2 and 3 may further be removed by one or more washing steps.

In a similar mechanism to the one outlined above, it is believed that organosulfonates react with free radicals after exposure to radiation in a pre-treatment solution to form sulfide compounds. For example, organosulfonates may react and form sulfates released in solution.

Benzenesulfinic acid, 4-hydroxybenzenesulfinic acid, 4-sulfinobenzoic acid, (herein compounds of formulas 4-6, respectively), 4-hydroxy sulfonic acid, and 4-ethyl sulfonic acid are organosulfonates that may be found in ion exchange resin:

formula (4)

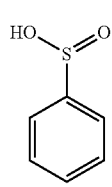

formula (5)

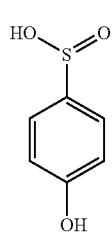

formula (6)

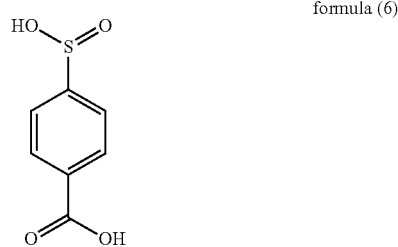

Compounds of formulas 7-10 are additional organic impurities that may be found on ion exchange resin and contribute to TOC concentration:

formula (7)

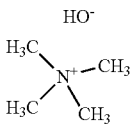

formula (8)

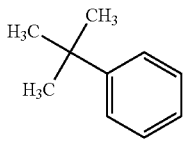

formula (9)

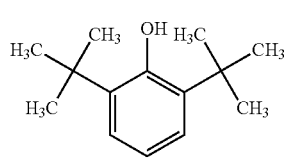

formula (10)

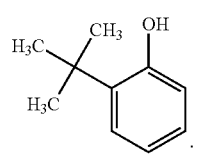

In some embodiments, the method of producing a treated ion exchange resin material comprises providing ion exchange resin and a pre-treatment solution in a vessel comprising a void space, and exposing the resin and the pre-treatment solution within the vessel to radiation, to produce a treated ion exchange resin material having reduced organic impurities.

Figure 3:
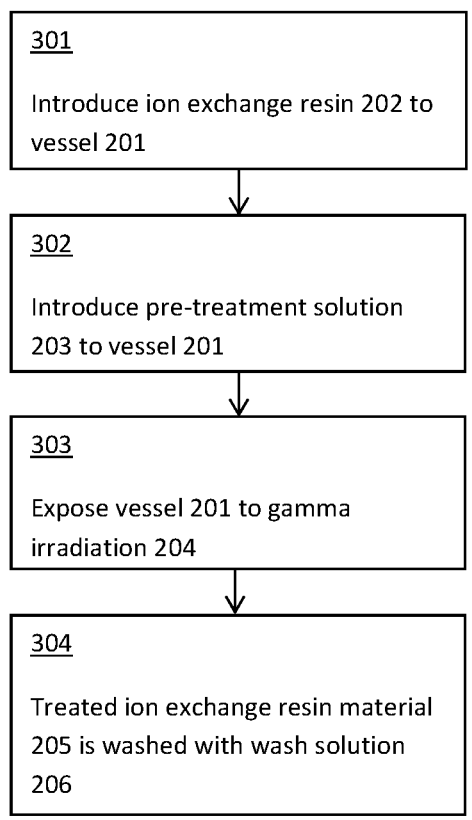
FIG. 3 is a block diagram of a method of producing treated ion exchange resin material, according to one embodiment.

FIG. 3 is a block diagram of a method of producing treated ion exchange resin material, according to one embodiment. In the specific embodiment shown in FIG. 3, steps 301 to 304 produce treated ion exchange resin material. Specifically, ion exchange resin 202 is introduced into vessel 201, pre-treatment solution 203 is introduced into vessel 201, vessel 201 comprising ion exchange resin 202 and pre-treatment solution 203 is exposed to high energy radiation 204, and produced treated ion exchange resin material 205 is washed with wash solution 206.

Ion exchange resins may be at least one of an anion exchange resin, a cation exchange resin, and a mixed bed resin. Anion exchange resins have a positively charged matrix structure that attracts and adsorbs negatively charged ions or molecules and releases positively charged ions or molecules. Cation exchange resins have a negatively charged matrix structure that attracts and adsorbs positively charged ions or molecules and releases negatively charged ions or molecules. Mixed bed exchange resins comprise anion exchange resin and cation exchange resin.

FIG. 1 is a schematic diagram of a method of producing treated anion exchange resin. In the embodiment of FIG. 1, anion resin A-284 (a strong base resin available from Evoqua Water Technologies, Warrendale, Pa.) is contained in a drum vessel 101. After exposure to cobalt 60 gamma irradiation, chloride ions are released from the anion resin.

A vessel may be any hollow container used to house contents described herein. For example, a vessel may be a drum, canister, jar, bottle, container or any other receptacle. In some embodiments, the vessel comprises a polymer. In other embodiments the vessel comprises a metal. In yet other embodiments, the vessel comprises paperboard. A vessel may be comprised of a combination of materials. A vessel may comprise a plastic, paper fiber, aluminum foil, fiberboard, glass, polyethylene, polyester, steel, cardboard, or a combination thereof. A vessel may comprise a liner. For example, a vessel may comprise a plastic liner.

Pre-treatment solution may comprise water or water molecules. Pre-treatment solution may further comprise one or more of a solvent, an acid, a base, gas dispersion, an inert gas, or a chemical wash. For example, pre-treatment solution may comprise isopropyl alcohol, methanol, ethanol, sulfuric acid, hydrochloric acid, sodium hydroxide, argon gas, or nitrogen gas. In some embodiments pre-treatment solution is purified water. As disclosed herein, "purified" water refers to water that contains a limited amount of contaminants. Specifically, purified water may contain a limited amount of ions. For example, purified water may be deionized water, ultrapure water, high purity water, distilled water, microfiltered water, ultrafiltered water, water that has been subjected to reverse osmosis or ultraviolet oxidation, granular activated carbon treated water, or water that has otherwise been processed to remove contaminants. In some embodiments, purified water has a resistivity of at least 10 megohms. In other embodiments, purified water has a resistivity of at least 14 megohms. In yet other embodiments, purified water has a resistivity of at least 18 megohms. Purified water may have a resistivity of at least about 10, 11, 12, 13, 14, 15, 16, 17, or 18 megohms. In some embodiments, pre-treatment solution comprises interstitial moisture within the ion exchange resin.

As disclosed herein "void space" may refer to headspace, void volume, air space, interstitial space between resin, volatile species, any space between contents and a vessel, any space within contents in a vessel, or all volume in a vessel that corresponds to total volume within the vessel less volume of resin. In some embodiments, ion exchange resin and pre-treatment solution provided in a vessel comprising a void space are exposed to radiation. During irradiation, impurities or ions from ion exchange resin may be released into the gas phase and be found in void space above the resin. For example, up to ten percent of all volatiles released from the resin during irradiation may reside in void space. Volatiles may comprise organic chloride, organic sulfide, or total organic carbon. While not wishing to be bound by theory, it is believed that during irradiation of ion exchange resin, tetramethylammoniumhydroxide may form an azeotrope with organochlorides or other organic species and water vapor, for example meta bis t-butylbenzene. This reaction may release organic species into the void space, which were previously retained in the resin bead pores. Exposing void space to radiation may break down organic species in the void space and prevent volatile ions from depositing on treated ion exchange resin.

In some embodiments, ion exchange resin is exposed to direct radiation. In other embodiments, ion exchange resin is contained in pre-treatment solution and exposed to direct radiation. In yet other embodiments, ion exchange resin is contained in a vessel and exposed to direct radiation. Exposing ion exchange resin to radiation may comprise placing the resin in proximity with a source of radiation. A source of high energy radiation may be one or more of cobalt 60, cesium 137, a synchrotron, and nuclear reactor beam lines. In some embodiments, a source of gamma irradiation is cobalt 60. Other sources of high energy radiation are available, provided they are able to generate the required intensity of radiation.

Radiation may be in the form of electromagnetic radiation. Specifically, radiation may be X-ray, gamma, ultraviolet, neutron activation, or any such form of high energy radiation that is capable of penetrating a resin bead without creating a radioactive byproduct, and does not cause sustained damage to resin material. For example, radiation should not break down a polymer backbone of an ion exchange resin. In some embodiments, the radiation is gamma irradiation.

A dosage of high energy radiation is measured in Grays. 1 Gray (Gy) is equal to the absorption of 1 Joule of energy from ionizing radiation per 1 kilogram of matter.

$$1 Gy = 1\frac{J}{kg} = 1\frac{m^2}{s^2}$$

In some embodiments, a dosage of radiation is in a range of about 0.1 KGy to about 10 MGy. In other embodiments, a dosage of radiation is in a range of about 0.1 KGy to about 1 MGy. In other embodiments, a dosage of radiation is in a range of about 25 KGy to about 200 KGy. In other embodiments, a dosage of radiation is in a range of about 25 KGy to about 100 KGy. In yet other embodiments, a dosage of radiation is in a range of about 25 KGy to about 75 KGy. For example, gamma irradiation may be about 10, 15, 20, 25, 30, 35, 40, 45, 50, 55, 60, 65, 70, 75, 80, 85, 90, 95, 100, 110, 120, 130, 140, 150, 160, 170, 180, 190, or 200 KGy. A dosage of high energy radiation may be as high as necessary without causing damage to an irradiated ion exchange resin. Damage may be, for example, causing break down of an ion exchange resin bead or backbone.

A dosage of radiation may be measured, for example, with a dosimeter. In some embodiments, ion exchange resin is exposed to high energy radiation until a dosimeter records a desired dosage of absorbed radiation. In other embodiments, ion exchange resin is exposed to high energy radiation for a desired amount of time. In yet other embodiments, ion exchange resin is exposed to high energy radiation for a desired number of vessel rotations or revolutions. In some embodiments, it is desirable to obtain an even dose of radiation throughout an ion exchange resin.

While not wishing to be bound by theory, it is believed that gamma irradiation greater than about 200 KGy or greater than about 100 KGy, may be damaging to certain ion exchange resins. For example, elevated gamma irradiation may cause damage to a polystyrene or polymer backbone of an ion exchange resin. The extent of damage caused to an ion exchange resin may be specific to resin type or manufacturing materials. For example, a dosage of gamma irradiation causing damage to an anion resin may not cause damage to a cation resin.

At the outset, a distinction will be made between reduced organic impurities in a resin material and reduced organic compounds or ion concentration in a solution that is contacted with a resin material. Organic impurities in a resin material and organic compounds in a solution contacted with a resin material may have distinct values and may be calculated through distinct methods.

Treated ion exchange resin material comprises reduced organic impurities or TOC. Specifically, treated ion exchange resin material comprises reduced organic impurities or TOC, as compared to untreated ion exchange resin. As disclosed herein "untreated" ion exchange resin refers to ion exchange resin that has not been exposed to radiation. In some embodiments, treated ion exchange resin material comprises less than about 20,000 ion intensity counts of a compound of formula 1. In other embodiments, treated ion exchange resin material comprises less than about 10,000 ion intensity counts of a compound of formula 1. Ion intensity counts can be calculated and tabulated using commercially available Mestrenova™ software (commercially available from Mestrelab Research, A. Coruña, Spain). Specifically, ion intensity is a value of the Mass Spectrometry (MS) or Nuclear Magnetic Resonance (NMR) intensity of a molecular ion cluster peak.

Ion intensity counts may be quantified further to determine concentration level by using calibration standards and complete extraction. In some embodiments, treated ion exchange resin material comprises about 1-30 ppm organic impurities or TOC. In other embodiments, treated ion exchange resin material comprises about 1-10 ppm organic impurities or TOC. In other embodiments, treated ion exchange resin comprises 1-10 ppb organic impurities or TOC. In yet other embodiments, treated ion exchange resin comprises 1-100 ppt organic impurities or TOC. A quantification of ion intensity counts or concentration of organic impurities or TOC may vary depending on resin type or material.

The method of producing a treated ion exchange resin material may further comprise washing the treated ion exchange resin material. Washing treated resin material may further extract organic impurities from treated resin. Specifically water-soluble impurities, for example, compounds of formulas 2 and 3, may be removed by washing.

As disclosed herein, "washing" refers to rinsing, soaking, immersing, dousing, drenching, flushing, dampening, spraying, or otherwise contacting treated resin material with a wash solution. In some embodiments, wash solution comprises purified water. For example, purified water may be deionized water, ultrapure water, high purity water, distilled water, microfiltered water, ultrafiltered water, granular activated carbon treated water, water that has been subjected to reverse osmosis or ultraviolet oxidation, water that has been carbon treated, or water that has otherwise been processed to remove contaminants. Wash solution may further comprise one or more of a solvent, an acid, a base, gas dispersion, an inert gas, or a chemical wash. For example, wash solution may comprise isopropyl alcohol, methanol, ethanol, sulfuric acid, hydrochloric acid, sodium hydroxide, argon gas, or nitrogen gas. Washing treated resin may further comprise chemical regeneration of ion exchange resin.

In some embodiments, organic impurities are one or more of organic chloride compounds, organic sulfide compounds, and total organic carbon compounds. For example, organic impurities may comprise one or more of organochlorides and organosulfonates. In other embodiments, organic impurities are organically bound ions. For example, organic impurities may comprise organically bound chloride or organically bound sulfide. Organic impurities may be selected from the group consisting of formulas 1-6 and combinations thereof. In yet other embodiments, organic impurities are selected from formulas 1-10, bi-products or intermediates of a reaction between any of formulas 1-10 and a free radical, compounds listed in Table 1, and combinations thereof.

In some embodiments, a treated ion exchange resin material contains a reduced level of organic impurities, as compared to an untreated ion exchange resin. In some embodiments, a level of organic impurities is measured quantitatively in ion intensity counts or concentration level and compared. A treated ion exchange resin material may be produced by the method of producing a treated ion exchange resin material, as disclosed herein. Specifically, a treated ion exchange resin material may be produced by a method comprising providing ion exchange resin and a pre-treatment solution in a vessel comprising a void space, and exposing the vessel to radiation.

Figure 2:
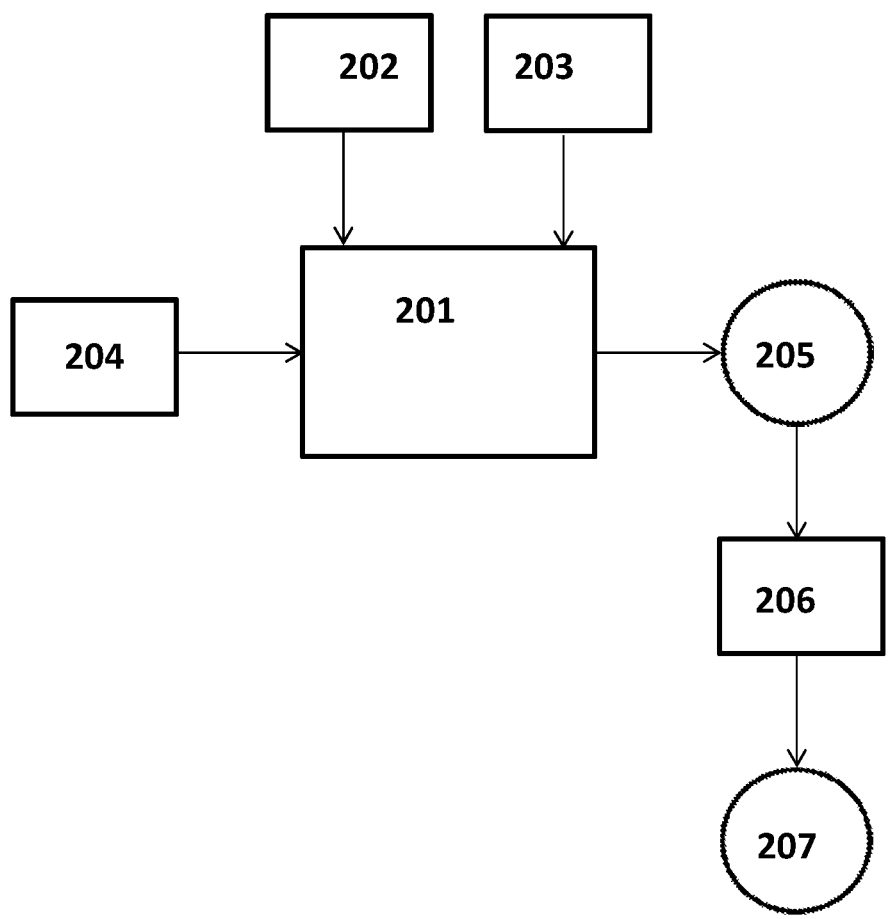
FIG. 2 is a block diagram of a method of producing treated ion exchange resin material, according to one embodiment.

FIG. 2 is a block diagram of a method of producing treated ion exchange resin material, according to one embodiment. As shown in the embodiment of FIG. 2, ion exchange resin 202 and pre-treatment solution 203 are contained in vessel 201 and exposed to radiation 204. Treated ion exchange resin material 205 is produced by the method of the described embodiment, and is subsequently washed with wash solution 206 to produce an alternate embodiment of treated ion exchange resin material 207.

In some embodiments, a treated ion exchange resin material comprises reduced organic impurities. In other embodiments, a treated ion exchange resin material is capable of purifying a water solution to contain less than about 1.0 ppb chloride compounds, less than about 1.0 ppb sulfide compounds, and less than about 10 ppb total organic carbon compounds. A treated ion exchange resin material may be capable of purifying a water solution to contain less than about 3.0, 2.5, 2.0, 1.5, 1.0, or 0.5 ppb ion or TOC compounds into the solution. A treated ion exchange resin material may be capable of purifying a water solution to contain less than about 400, 300, 200, 100, 50, 10, 5 or 1.0 ppt ion or TOC compounds into the solution. In some embodiments, a treated ion exchange resin material may be capable of purifying an ultrapure water solution to contain less than about 3.0, 2.5, 2.0, 1.5, 1.0, or 0.5 ppb ion or TOC compounds or less than about 400, 300, 200, 100, 50, 10, 5 or 1.0 ppt ion or TOC compounds. In some embodiments, a treated ion exchange resin material may be capable of purifying a water solution to contain less than about 3.0, 2.5, 2.0, 1.5, 1.0, or 0.5 ppb chloride, sulfide, or sulfate compounds or less than about 400, 300, 200, 100, 50, 10, 5 or 1.0 ppt chloride, sulfide, or sulfate compounds.

As used herein, "chloride compound" refers to any chlorine compound that is released from the resin. For example, chloride compound includes a chlorine compound, a chloride ion ($Cl^-$), or a salt of a chloride ion. As used herein, "sulfide compound" refers to any sulfur compound that is released from the resin. For example, sulfide compound includes a dissolved free sulfide ($H_2S$, $HS^-$, $S^{2-}$), a sulfide ion, a salt of a sulfide ion, sulfite ($SO_3^{2-}$), sulfoxides, or sulfate ($SO_4^{2-}$).

It is discovered that treated ion exchange resin material may be used in applications with very high purity requirements. The nuclear and semiconductor industries require ion exchange resins that are able to purify water to contain less than about 2.5 ppb chloride, sulfide, and sodium concentration. There is an increasing demand for ion exchange resins having the ability to purify solutions to ion and TOC concentrations of less than 1.0 ppb, less than 0.1 ppb, or less than 10 ppt. Treated ion exchange resin material may be used to purify nuclear reactor cooling solution or semiconductor manufacturing solution.

In some embodiments, the method of obtaining a reduced ion or TOC concentration in a solution comprises providing a solution and contacting the solution with a treated ion exchange resin material having reduced organic impurities.

Figure 4:
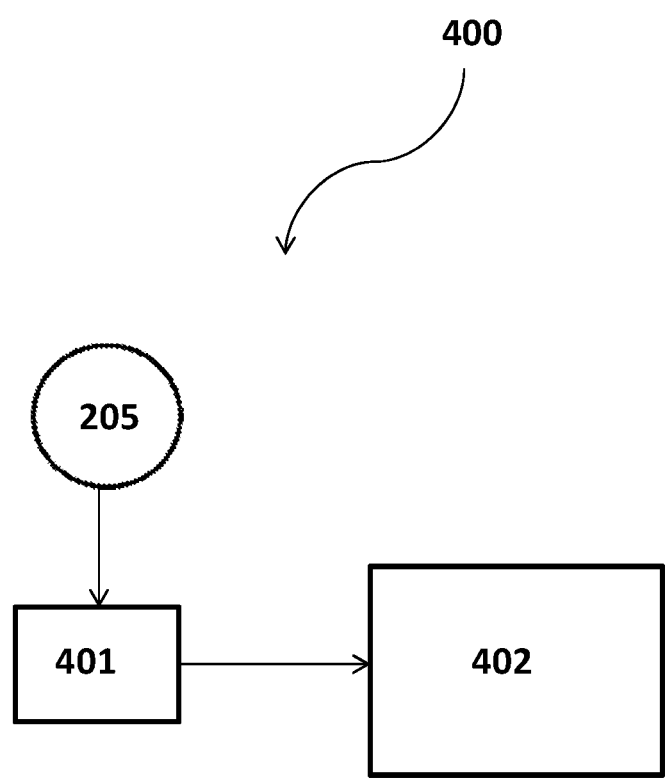
FIG. 4 is a block diagram of a method of obtaining a reduced ion concentration in a solution, according to one embodiment.

FIG. 4 is a block diagram of a method of obtaining a reduced ion concentration in a solution, according to one embodiment. In the embodiment of FIG. 4, during method 400 of obtaining a reduced ion or TOC concentration in a solution, treated ion exchange material 205 is contacted with solution 401 to obtain a solution with reduced ion or TOC concentration 402.

The method of obtaining a reduced ion or TOC concentration in solution may further comprise exposing ion exchange resin to high energy radiation to produce the treated ion exchange resin material, prior to contacting the solution. The method of obtaining a reduced ion or TOC concentration in solution may further comprise exposing ion exchange resin to gamma irradiation to produce the treated ion exchange resin material, prior to contacting the solution.

The method of obtaining a reduced ion or TOC concentration in solution may further comprise providing nuclear reactor cooling solution and contacting the nuclear reactor cooling solution with a treated ion exchange resin material having reduced organic impurities. The method of obtaining a reduced ion or TOC concentration in solution may further comprise providing electronics manufacturing solution and contacting the electronics manufacturing solution with a treated ion exchange resin material having reduced organic impurities.

In some embodiments, a reduced ion or TOC concentration in solution is less than about 3.0, 2.5, 2.0, 1.5, 1.0, 0.5, 0.1, or 0.05 ppb ion compounds or TOC. In some embodiments, a reduced ion or TOC concentration in solution is less than about 400, 300, 200, 100, 50, 10, or 1.0 ppt ion compounds or TOC. In some embodiments, ion compounds are selected from chloride, sulfide, bromide, sodium, fluoride, nitrate ions, and combinations thereof. For example, a reduced ion or TOC concentration in a solution may comprise a reduced chloride and sulfide concentration. A reduced ion or TOC concentration may comprise less than about 3.0 ppb chloride compounds, less than about 2.0 ppb chloride compounds, less than about 1.0 ppb chloride compounds, less than about 0.1 ppb chloride compounds, less than 10 ppt chloride compounds, less than about 3.0 ppb sulfide compounds, less than about 2.0 ppb sulfide compounds, less than about 1.0 ppb sulfide compounds, less than about 0.1 ppb sulfide compounds, less than about 10 ppt sulfide compounds. As used herein, "TOC concentration" refers to the total amount of carbon in solution or in an ion exchange resin.

A reduced ion or TOC concentration in a solution may comprise a reduced sulfate concentration. A reduced ion or TOC concentration may comprise less than about 3.0 ppb sulfate compounds, less than about 2.0 ppb sulfate compounds, less than about 1.0 ppb sulfate compounds, less than 0.1 ppb sulfate compounds, or less than 10 ppt sulfate compounds.

In some embodiments, treated ion exchange resin material has been exposed to high energy radiation. For example, treated ion exchange resin material may have been exposed to gamma irradiation. Treated ion exchange resin material may be in the form of ion exchange resin beads. In some embodiments, treated ion exchange resin material is contained in a chromatography column, a resin bed, or a membrane. Contacting solution with a treated ion exchange resin material may comprise contacting solution with resin beads, a resin column, a resin bed, or a resin membrane.

EXAMPLES

Example 1: Determination of Organic Impurities in Ion Exchange Resin

Elevated levels of chloride and sulfate were detected in nuclear reactor cooling solution samples that were being purified by anion and cation ion exchange resins, separately. The elevated chloride concentration was identified as being caused by a reaction between organochloride impurities in the ion exchange resin and free radicals in the solution. It is believed that elevated sulfate concentration is caused by organosulfonate impurities in the ion exchange resin.

The organochloride impurities were traced for three ion exchange resin manufacturers, A, B, and C. The origin of the impurities is an incomplete Friedel Crafts reaction during manufacturing, which installs the chloromethyl group prior attaching the trimethylammonium cation group (for anion resins). Using gas chromatography/mass spectrometry (GC/MS), three organochloride compounds were identified in anion and cation ion exchange resins, alike. Two monochloro compounds (214 m/e and 212 m/e, herein labeled as formula 2 and formula 3, respectively) and one dichloro compound (248 m/e, herein labeled as formula 1) were identified:

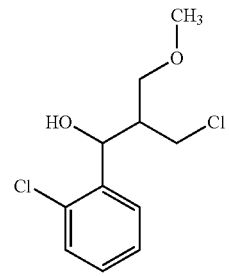

formula (1)

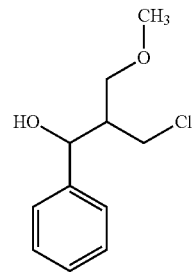

formula (2)

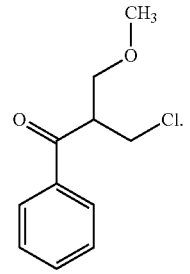

formula (3)

To identify and quantify the compounds of formulas 1-3, the ion exchange resins were cryoground with liquid nitrogen and analyzed with GC/MS. The data was recorded with Mestrenova™ software for ion intensity and National Institute of Standards and Technology (NIST) database searching. Table 2 summarizes ion intensity count for the compounds of formulas 1-3 and percent chlorine on solid resin, for several anion exchange resins that have not been exposed to radiation.

TABLE 2 ion intensity counts and percent chlorine released into solution by anion exchange resins.

| Manufacturer | Resin Type | Formula 1 (ion intensity counts) | Formula 2 (ion intensity counts) | Formula 3 (ion intensity counts) | Percent chlorine on solid resin, by chemical capacity(%) |
|---|---|---|---|---|---|
| A | A-284 COH | 9,967 | 1,521 | 0 | 0.19 |
| C | A-284(Cl) | 10,389 | 93,959 | 76,194 | |
| C | A-284 (Cl) | 10,392 | 144,807 | 77,986 | |
| B | A-284 COH | 24,286 | 2,194 | 0 | 0.03 |
| B | A284 COH | 30,337 | 2,049 | 682 | 0.00 |
| B | A-284 C(OH) | 65,922 | 4,920 | 443 | 0.03 |
| B | A-284COH | 67,000 | 1,576 | 1,201 | 0.07 |
| B | A284 COH | 253,942 | 29,703 | 6,624 | 0.09 |
| B | A284 SG OH | 296,965 | 59,412 | 16,144 | 0.21 |

In general, ion intensity counts for compounds of formula 1 were greater than about 10,000 counts, while ion intensity counts for compounds of formulas 2 and 3 varied widely. At least one sample was recorded as having an ion intensity count of 296,965 for compounds of formula 1, resulting in a 0.21% chlorine concentration on solid resin, by chemical resin capacity exchange. The data suggest a high presence of organic impurities in ion exchange resin. Specifically, the data show a high ion intensity count for compounds of formulas 1-3 in untreated ion exchange resin, and a high percent chlorine on the solid resin.

Example 2: Determination of Organic Impurities in Mixed Bed Ion Exchange Resin

Mixed bed ion exchange resin comprising C-471 CH and A-284 COH cation and anion resins, respectively, were cryoground with liquid nitrogen and analyzed with GC/MS. Anion exchange resins A-284 and cation exchange resins C-471 are commercially available from Evoqua Water Technologies, Warrendale, Pa. The compounds of formulas 7-10 were identified:

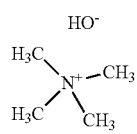

formula (7)

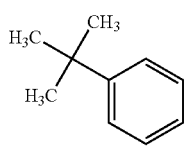

formula (8)

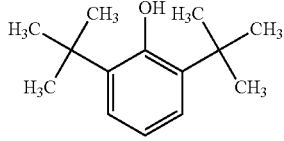

formula (9)

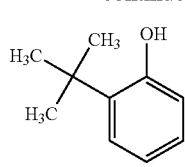

formula (10)

While not wishing to be bound by theory, it is believed that at least some of the compounds of formulas 7-10 are structures from breakdown of resin antioxidant 4703.

Compounds of formulas 7-10 are alternate organic impurities that may cause elevated ion concentrations in solution.

Example 3: Gamma Irradiation of Ion Exchange Resins

A-284, C-471 and Supplier A cation ion exchange resins were independently placed in large cardboard five cubic feet drums having metal banded lids and plastic liners. The drums contained ultrapure water and sufficient void space. The cardboard drums are commercially available from Grief Inc., Delaware, Ohio. The drum weight was essentially maintained across tested samples. The density of contents in the drum was essentially maintained across tested samples.

The drums were exposed to a closed cobalt 60 gamma irradiation source to produce ion exchange resin that has been exposed to three different irradiation intensity dosage ranges: 25 KGy-50 KGy, 50 KGy-75 KGy, and 75 KGy-160 KGy, as measured with a dosimeter. Organic impurities were analyzed in the exposed resin and the void space in the drum, and quantified using sequential multiple thread fiber extractions and GC/MS. Table 3 summarizes ion intensity counts for the compounds of formulas 1-3 on certain anion exchange resins, after exposure to the varying gamma irradiation dosage ranges.

TABLE 3 ion intensity counts in anion exchange resin after exposure to gamma irradiation.

| Manufacturer | Resin Type | Irradiation Dosage (KGy) | Formula 1 (ion intensity counts) | Formula 2 (ion intensity counts) | Formula 3 (ion intensity counts) |
|---|---|---|---|---|---|
| A | A-284 C Cl | 25-50 | 0 | 486 | 925 |
| A | A-284 C Cl | 50-75 | 0 | 345 | 744 |
| A | A-284 C Cl | 75-160 | 5,933 | 13,786 | 15,689 |
| A | A-284 COH | 25-50 | 340 | 0 | 0 |
| A | A-284 COH | 50-75 | 404 | 0 | 0 |
| A | A-284 COH | 75-160 | 4,812 | 3,751 | 6,207 |

After irradiation, anion exchange resins exhibited a reduced amount of ion intensity counts for compounds of formula 1, as compared to the non-irradiated ion exchange resins summarized in Table 2. Ion intensity counts for compounds of formulas 2 and 3 also exhibited a general decrease in number as compared to Example 2. The data show that exposure to high energy radiation, in this example gamma irradiation, may produce an ion exchange resin material having reduced organic impurities. Thus, the data show the effectiveness of providing ion exchange resin and a pre-treatment solution in a vessel comprising a void space and exposing the resin and the pre-treatment solution within the vessel to high energy radiation, in the production of a treated ion exchange resin material having reduced organic impurities.

The compounds of formulas 2 and 3 may have increased in ion intensity count because, as previously noted, the compound of formula 1 breaks down into one or more of the compounds of formulas 2 and 3 after exposure to radiation.

It should be noted that certain of the ion exchange resins that were tested exhibited a larger amount of ion intensity counts for the compound of formula 1 after exposure to gamma irradiation greater than 75 KGy (between about 75 KGy and 160 KGy) as compared to ion intensity counts after exposure to less than 75 KGy (between 25 KGy and 75 KGy). It is hypothesized that a high level of radiation exposure may break down certain resin materials, resulting in a greater amount of organic impurities in the resin.

Table 4 summarizes ion intensity counts for the compounds of formulas 1-3 on certain cation exchange resins before exposure to any high energy radiation, and after exposure to the varying gamma irradiation ranges.

TABLE 4 ion intensity counts in cation exchange resin before and after exposure to gamma irradiation.

| Manufacturer | Resin Type | Irradiation Dosage (KGy) | Formula 1 (ion intensity counts) | Formula 2 (ion intensity counts) | Formula 3 (ion intensity counts) |
|---|---|---|---|---|---|
| A | Supplier A Cation | None | 4,660 | 151 | 1,942 |
| A | Supplier A Cation | 75-160 | 20,823 | 127,341 | 79,079 |
| A | C-471 CH | 75-160 | 429 | 177 | 0 |
| A | C-471 CH | None | 5,311 | 0 | 613 |
| A | C-471 CH | 75-160 | 159 | 1,557 | 0 |
| A | Purcat C-471 CH | None | 4,911 | 1,442 | 712 |
| A | C-471 CH | 75-160 | 159 | 1,557 | 0 |

Cation exchange resin C-471 is a strong acid cation resin. Cation exchange resin C-471 exhibits a reduced amount of compounds of formula 1 after exposure to gamma irradiation. For example, irradiated ion exchange resin measured less than 429 ion intensity counts of formula 1, while non-irradiated resin measured at least 4,911 counts. Accordingly, exposure to high energy radiation may produce both anion and cation exchange resin material having reduced organic impurities.

Example 4: Gamma Irradiation of Void Space

Void space specimens pertaining to the five cubit feet drums containing anion resin, as described above in Example 3, were stored in a cooler room at a temperature of 4° C. and later analyzed. The void space was analyzed for concentrations of the compounds of formulas 1-3 found in the vapor phase and quantified using GC/MS. Table 5 summarizes ion intensity counts for the compounds of formulas 1-3 in the void space, after exposure to the varying gamma irradiation ranges.

TABLE 5 ion intensity counts in void space of drums containing anion exchange resin, after exposure to gamma irradiation.

| Manufacturer | Resin Type | Irradiation Dosage (KGy) | Formula 1 (ion intensity counts) | Formula 2 (ion intensity counts) | Formula 3 (ion intensity counts) |
|---|---|---|---|---|---|
| A | A-284 C Cl | 25-50 | 0 | 0 | 0 |
| A | A-284 C Cl | 50-75 | 0 | 0 | 0 |
| A | A-284 C Cl | 75-160 | 0 | 0 | 0 |
| A | A-284 COH | 25-50 | 0 | 0 | 0 |
| A | A-284 COH | 50-75 | 0 | 0 | 0 |
| A | A-284 COH | 75-160 | 0 | 0 | 0 |

As shown in Table 5, no significant ion intensity of any of the compounds of formulas 1-3 was measured in the void space specimens taken from the anion five cubic feet drums. The data show that organic impurities from the resin did not evaporate into the void space after exposure to radiation, but instead were chemically changed by the irradiation process in both the resin and the void space. The volatile organic species were broken down to such a degree that they were no longer quantifiable. Thus, exposure to high energy radiation of ion exchange resin in a vessel comprising pretreatment solution and void space produces both a treated ion exchange resin having reduced organic impurities and a void space having substantially no evaporated organic impurities.

Example 5: Gamma Irradiation of Mixed Bed Ion Exchange Resins

Mixed bed ion exchange resin containing 30% by volume C-471 cation resin and 70% by volume A-284 anion resin was exposed to gamma irradiation at a dosage of 75 KGy and rinsed with ultrahigh purity deionized water at a constant flow rate for three days in a high purity PVD plastic column following exposure. TOC was measured with a Sievers™ TOC analyzer.

Figure 5:
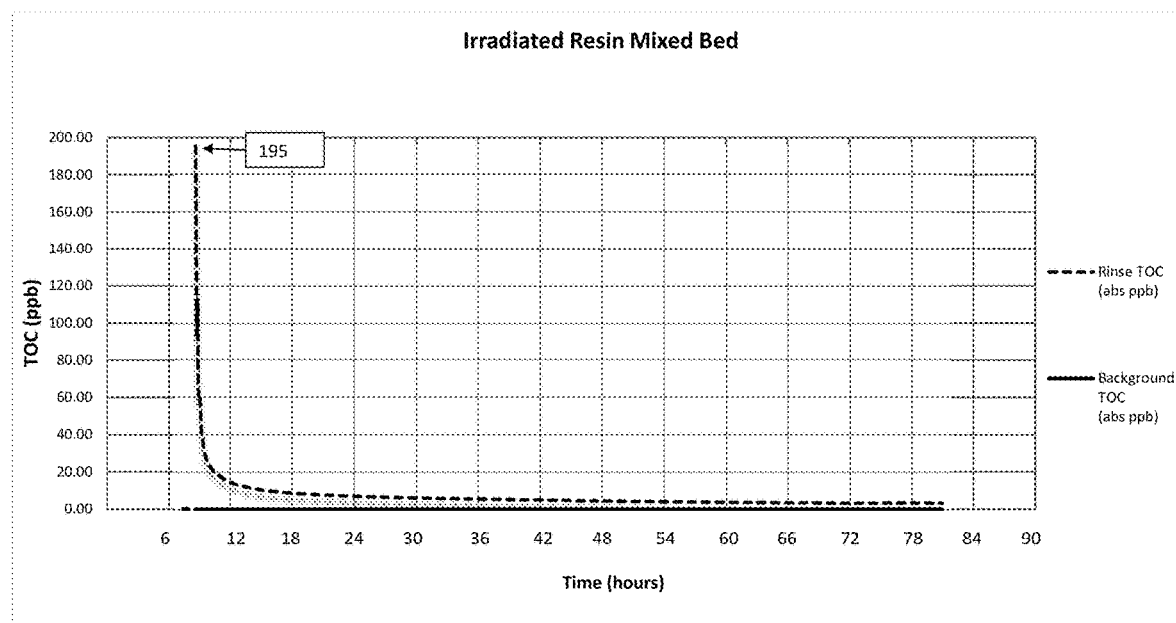
FIG. 5 is a line graph of reduction of TOC concentration over time in an irradiated mixed bed resin.

The graph of FIG. 5 shows a reduction in TOC following gamma irradiation and a three day rinse. TOC was reduced from 195 ppb to less than 10 ppb after 3 days. The data show that gamma irradiation to mixed bed ion exchange resin reduces the amount of TOC in the resin. Thus, the data show that exposure to high energy radiation may produce a mixed bed ion exchange resin material having reduced TOC impurities.

Example 6: Washing Treated Ion Exchange Resin

A-284 and C-471 anion and cation resin were exposed to gamma irradiation separately at a dosage of 75 KGy. One bed volume (BV) of each irradiated resin was rinsed and analyzed via column chromatography, as in Example 5.

Figure 6A:
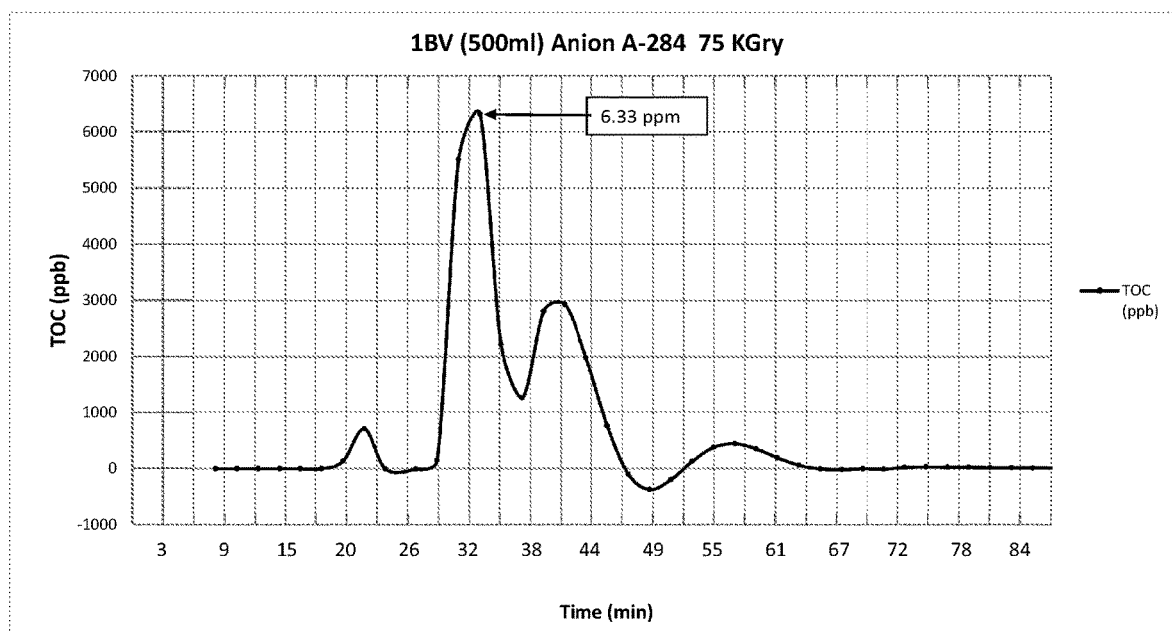
FIG. 6A is a chromatograph of TOC concentration in the eluent of an anion resin chromatography column.
Figure 6B:
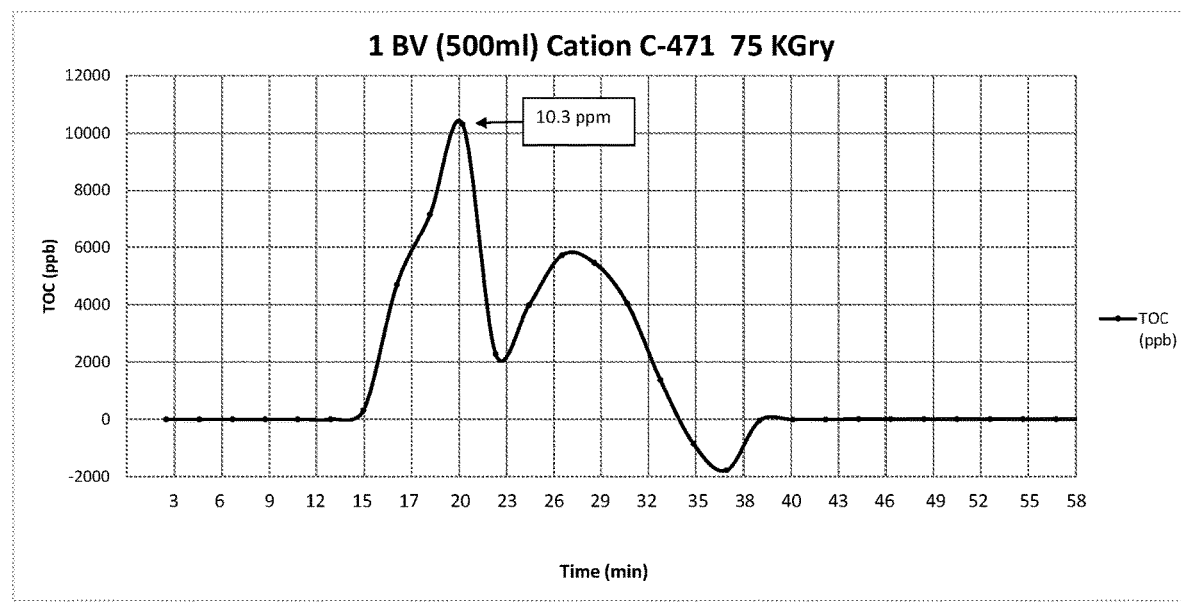
FIG. 6B is a chromatograph of TOC concentration in the eluent of a cation resin chromatography column

TOC concentration in the eluent of the anion resin column is shown in the chromatograph labeled FIG. 6A. TOC concentration in the eluent of the cation resin column is shown in the chromatograph labeled FIG. 6B. The chromatographs are adjusted to account for TOC concentration in the ultrahigh purity deionized water.

The anion resin shows a peak TOC concentration of 6.33 ppm after about 33 minutes of elution, and balances to 0 ppm after about 65 minutes of elution. The cation resin shows a peak TOC concentration of 10.3 ppm after about 20 minutes of elution and balances to 0 ppm after about 40 minutes of elution.

The data suggest that after elution for a predetermined period of time, for example 20, 30, 40, 50, 60, or 70 minutes, TOC is released from the ion exchange resin that has been previously exposed to high energy radiation. Thus, the data show that exposure to high energy radiation may produce anion and cation exchange resin material, separately, having reduced TOC. TOC can be released from anion resin and cation resin separately prior to combination of resin in a mixed bed. Alternatively, as shown in the data of Example 5, TOC can be released from anion exchange resin and cation exchange resin that were combined in a mixed bed prior to exposure to high energy radiation.

Example 7: Quantification of Organosulfonates in Ion Exchange Resin

C-471 cation exchange resin was exposed to gamma irradiation at a dosage of 75 KGy. The sample was cryoground and water extracted at 60° C. for 24 hours. The sample was subjected to High Performance Liquid Chromatography (HPLC) to extract organosulfonate species. The HPLC was equipped with a C-18 chromatography column and the eluents were 0.1% formic acid in water and 0.1% formic acid in acetonitrile. The organosulfonates were detected with a UV detector at 200-850 nm.

The organosulfonates were then quantified via Mass Spectrometry. Table 6 shows the concentration of several organosulfonate species in the exposed C-471 resin and in a similarly prepared sample of C-471 resin that was not exposed to radiation.

TABLE 6 concentration of organosulfonate species in C-471 cation exchange
resin, before and after exposure to gamma irradiation.

| Sulfate Species | Concentration (ppm) in C-471 non-irradiated resin | Concentration (ppm) in C-471 irradiated resin |
|---|---|---|
| benzene sulfonic acid | ND | 4.5 |
| 4-hydroxy sulfonic acid | 78.0 | 28.6 |
| 4-ethyl sulfonic acid | 116.4 | 18.4 |
| 4-sulfobenzoic acid | 247.5 | 66.5 |

As shown in Table 6, the concentration of each of organosulfonate species 4-hydroxy sulfonic acid, 4-ethylsulfonic acid, and 4-sulfobenzoic acid is visibly reduced in C-471 cation resin that has been exposed to 75 KGy of gamma irradiation. Thus, exposure to gamma irradiation produces an ion exchange resin having reduced organosulfonate compounds.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of an ion exchange resin treatment system. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to perform an ion exchange resin treatment method or components of an ion exchange resin treatment method, or to house or utilize a treated ion exchange resin. Accordingly the foregoing description and figures are by way of example only. Further the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

The invention claimed is:

1. A high energy radiation treated ion exchange resin material having reduced organic impurities and being capable of purifying an ultrapure water solution to contain less than about 1.0 ppb chloride compounds, less than about 1.0 ppb sulfide compounds, and less than about 10 ppb total organic carbon compounds,
   the treated ion exchange resin material comprising an anion exchange resin having reduced organochloride compounds; and/or
   the treated ion exchange resin material comprising a cation exchange resin having reduced organosulfonate compounds.

2. The treated ion exchange resin material of claim 1 being capable of purifying an ultrapure water solution to contain less than about 10 ppt chloride compounds, less than about 10 ppt sulfide compounds, and less than about 100 ppt total organic carbon compounds.

3. The treated ion exchange resin material of claim 1, wherein the sulfide compounds comprise sulfate.

4. The treated ion exchange resin material of claim 1, wherein the reduced organic impurities are selected from the group consisting of:

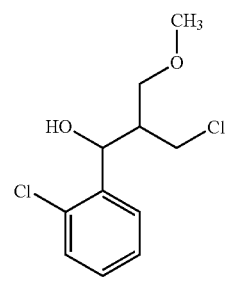

formula (1)

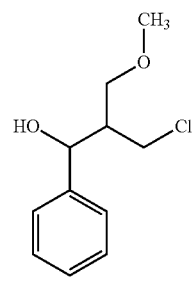

formula (2)

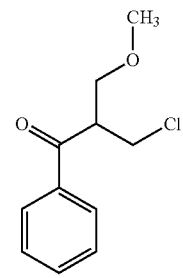

formula (3)

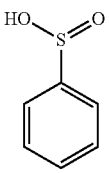

formula (4)

-continued formula (5)

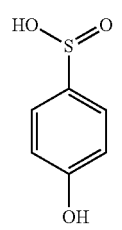

formula (6)

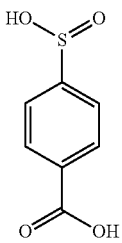

and combinations thereof.

5. The treated ion exchange resin material of claim 1, wherein the ion exchange resin material is one of an anion exchange resin and a mixed bed resin.

6. The treated ion exchange resin material of claim 1, wherein the ultrapure water solution is a nuclear reactor cooling solution or an electronics manufacturing solution.

7. A method of obtaining a reduced chloride and sulfate concentration in a solution comprising:
exposing ion exchange resin in a vessel comprising a pre-treatment solution and void space to high energy radiation to produce a treated ion exchange resin material having reduced organic impurities and a treated void space having reduced volatile organic species;
providing a solution and contacting the solution with the treated ion exchange resin material having reduced organic impurities.

8. The method of claim 7, wherein the organic impurities are selected from the group consisting of organochloride compounds, organosulfonate compounds, total organic compounds, and:

formula (1)

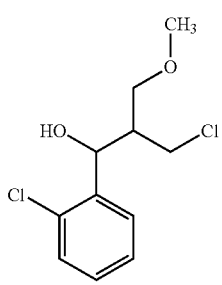

formula (2)

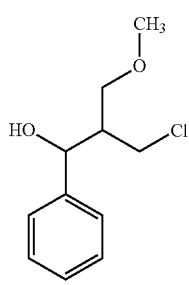

formula (3)

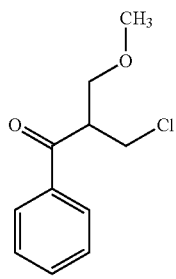

formula (4)

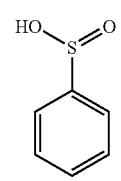

formula (5)

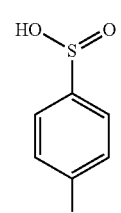

formula (6)

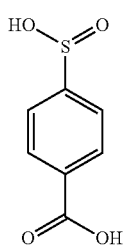

and combinations thereof.

9. The method of claim 7, comprising providing electronics manufacturing solution and contacting the electronics manufacturing solution with the treated ion exchange resin material having reduced organic impurities.

10. The method of claim 7, comprising providing nuclear reactor cooling solution and contacting the nuclear reactor cooling solution with the treated ion exchange resin material having reduced organic impurities.

11. The treated ion exchange resin of claim 1, wherein the organic impurities comprise non-soluble organic impurities.

12. The treated ion exchange resin of claim 1, having 1-30 ppm of total organic carbon (TOC).

13. The treated ion exchange resin of claim 1, formed by exposing ion exchange resin having organic impurities in a vessel comprising a pre-treatment solution and void space to the high energy radiation to produce the treated ion exchange resin material having reduced organic impurities.

14. The treated ion exchange resin of claim 13, wherein the ion exchange resin has more than 10,000 ion intensity counts of a compound of formula (1)

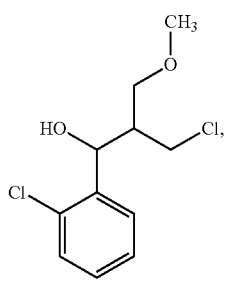

formula (1)

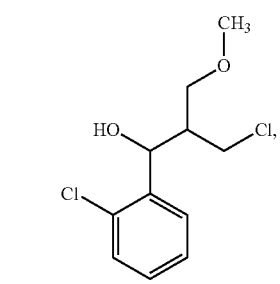

formula (1)

and the treated ion exchange resin has less than 10,000 ion intensity counts of the compound of formula (1).

15. The treated ion exchange resin of claim 13, formed by exposing the ion exchange resin having organic impurities in the vessel comprising the pre-treatment solution and void space to gamma irradiation at a dosage of about 25 KGy-75 KGy.

16. The method of claim 7, wherein the ion exchange resin has more than 10,000 ion intensity counts of a compound of formula (1)

and the treated ion exchange resin has less than 10,000 ion intensity counts of the compound of formula (1).

17. The method of claim 7, wherein the treated ion exchange resin has 1-30 ppm of total organic carbon (TOC).

18. The method of claim 7, comprising exposing the ion exchange resin having organic impurities in the vessel comprising the pre-treatment solution and void space to gamma irradiation at a dosage of about 25 KGy-75 KGy.

\* \* \* \* \*